Nov. 1, 1949.   J. D. BURKE ET AL   2,486,632
APPARATUS FOR MEASURING TORQUES
Filed Aug. 7, 1944   2 Sheets-Sheet 1
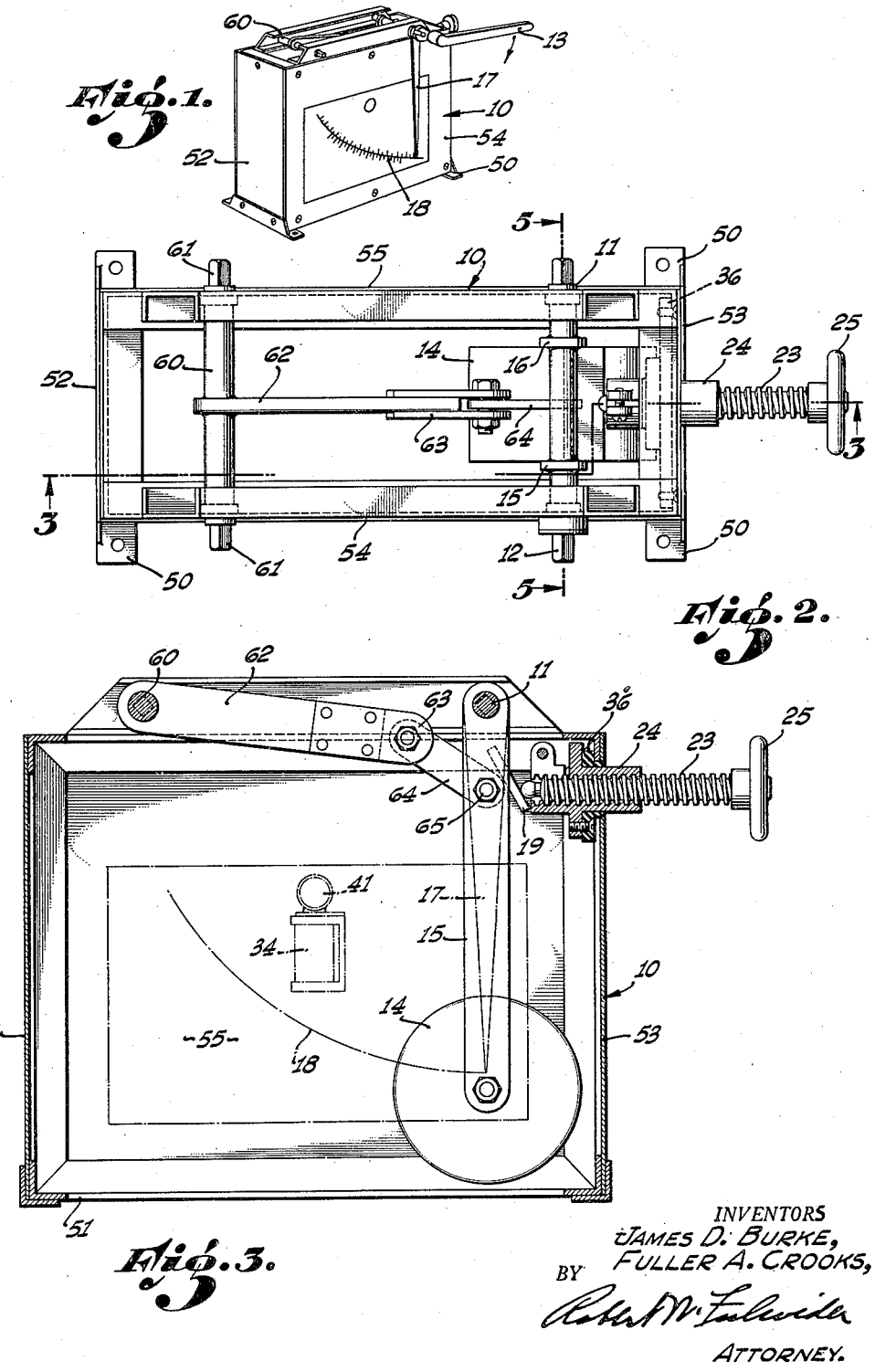
INVENTORS
JAMES D. BURKE,
FULLER A. CROOKS,
BY
ATTORNEY.

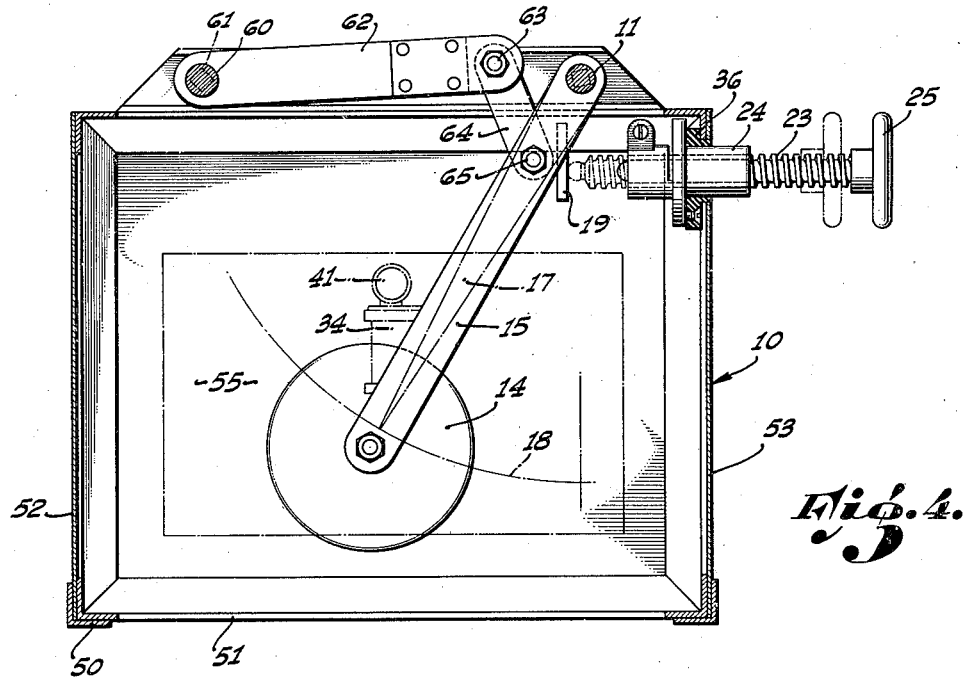
Fig. 4.
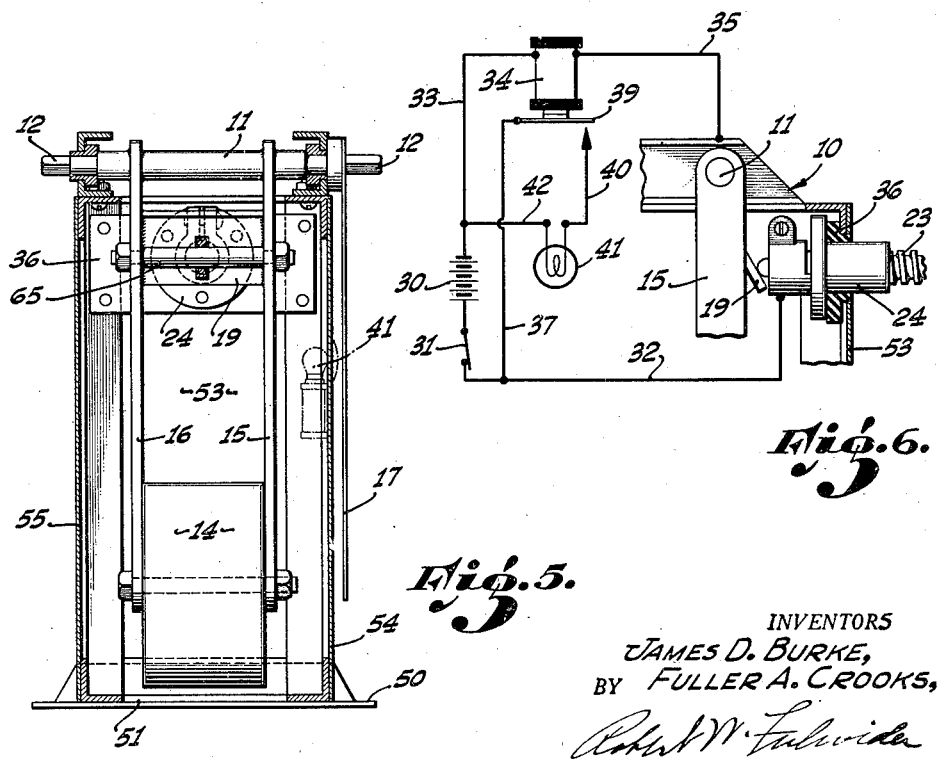
Fig. 5.
Fig. 6.
INVENTORS
JAMES D. BURKE,
BY FULLER A. CROOKS,
ATTORNEY.

Patented Nov. 1, 1949

2,486,632

UNITED STATES PATENT OFFICE 2,486,632

APPARATUS FOR MEASURING TORQUES

James D. Burke and Fuller A. Crooks, Hollywood, Calif.; said Burke assignor to A. Morgan Maree, Jr., Speed L. Post, Stanley E. Lindahl, and himself, all of Los Angeles County, Calif., as tenants in common Application August 7, 1944, Serial No. 548,364

11 Claims. (Cl. 73—1)

This invention relates generally to instruments for measuring torque and more particularly to instruments wherein the displacement of a movable weight is used to indicate the amount of torque. The invention is concerned particularly with an instrument suitable for measuring the torque exerted by wrenches and other torque tools of the type designed to slip, release or otherwise indicate when a certain torque is reached.

In assembling certain machinery, such as aircraft engines for example, it is required that nuts and screws be tightened smoothly, without jerking, and without exceeding a specified torque. This is generally accomplished by the use of a torque indicating tool such as referred to above. These tools require adjustment to the proper torque when first placed in use, and subsequently should be checked and adjusted periodically in order to correct for variations introduced by mistreatment or ordinary wear and tear. While devices are available for this purpose, most of them are expensive and of complicated construction.

It is therefore a major object of our invention to provide an instrument of simple and inexpensive construction which can be used by an unskilled operator to measure torque, particularly that applied by torque-indicating tools.

It is a further object of our invention to provide an instrument for measuring torque in which the movable parts are in a substantially static condition at the time of measuring the torque, thereby avoiding inaccuracies due to friction or to the inclusion of forces required to overcome inertia.

A still further object is to make provision for a plurality of ranges of measurement on the instrument, and to provide auxiliary means to indicate that the instrument is properly adjusted at the moment the reading is taken.

These and other objects and advantages of our invention will become apparent from the following description of a preferred form thereof, and from the accompanying drawings illustrating the same, in which:

Fig. 1 is a perspective view of a preferred form of device embodying our invention, shown in position for testing, Fig. 2 is a plan view of the device of Fig. 1, Fig. 3 is a vertical sectional view taken on the line 3—3 of Fig. 2, with the pendulum in its normal or rest position, Fig. 4 is a sectional view similar to Fig. 3 but showing the pendulum in operative or measuring position, Fig. 5 is a vertical section taken on the line 5—5 of Fig. 2, and Fig. 6 is a diagram of a circuit which may be used to indicate when contact is made between certain moving parts.

Referring now to the drawings and particularly to Figs. 2, 3 and 4 thereof, the numeral 10 denotes a housing comprising a framework formed of feet 50, a floor panel 51, end panels 52 and 53, and front and rear panels 54 and 55, respectively. A horizontal shaft 11 is journaled between panels 54 and 55 and is equipped with means such as a coupling 12 to which torque may be applied as by a wrench 13 in such a manner as to rotate shaft 11 in a clockwise direction (see Fig. 1). Referring again to the Figs. 3 and 4, it is seen that rotation of shaft 11 is resisted by a pendulum composed of a weight 14 suspended on arms 15 and 16 which are integrally coupled to shaft 11. Shaft 11 is provided with a pointer 17 which serves to indicate the extent of rotation on a scale 18 (see Fig. 1) located on the outside of housing 10.

When the pendulum is displaced from the vertical, the action of gravity upon it produces an opposing torque which is equal to the product of the weight of the pendulum times the horizontal distance between the center of gravity of the pendulum, and a vertical line through its fulcrum, i. e., the axis of shaft 11. As displacement of the pendulum increases, this horizontal distance increases, thus providing a continually increasing torque resisting further displacement. A wide range of torques may therefore be measured, their magnitude being indicated by the extent of pendulum displacement.

When a torque tool is to be tested, it is applied to coupling 12 and a clockwise torque is exerted. This results in rotation of the shaft 11 and consequent movement of the pendulum to some such position as that illustrated in Fig. 4. If the torque tool is not of the break-away or releasing type but is designed to indicate torque in some other manner, for instance by means of a spring actuated pointer, then the torque applied to the shaft 11 is increased until the desired magnitude is reached as shown on scale 18 by pointer 17; the tool and the instrument are then held in static equilibrium while the indicating means of the tool is checked to see whether or not it registers torque correctly.

The invention as thus described may also be used to measure the critical torque of releasing or break-away type tools if care is exercised in its manipulation. It has been found, however, that tools of this class will frequently release or break-away when the pointer is indicating a substantially smaller torque than that which is actually being applied to the wrench. This error arises from the manner of applying the tool to the device; if it is in motion at the time break-away occurs, the torque causing break-away is composed of three parts, namely, the torque required to overcome friction, the torque required to accelerate the pendulum in its rotational motion, and the torque required to support the pendulum at a particular angle. Only the last of these should be indicated on scale 18 since the others are subject to variations and are not susceptible of easy measurement.

From the foregoing it is seen that it is desirable to measure the break-away torque of the tool with the torque meter parts in practically static condition. To accomplish this purpose, we provide follow-up means preferably in the form of a threaded spindle 23 which passes through an internally threaded bushing 24 mounted in the end wall 53 of the frame 10 and adapted to engage a plate 19 mounted on pendulum arms 15 and 16 slightly below shaft 11. By turning a handle 25 fixed to the outer end of spindle 23, the spindle may be fed through bushing 24 until its inner end comes to rest against plate 19, thus supporting the pendulum in any desired position.

When it is desired to measure the break-away torque of a particular tool, the tool is applied to coupling 12 and torque is slowly exerted until break-away occurs. Simultaneously with the application of torque, handle 25 is rotated and the spindle 23 fed through bushing 24 so as to follow the movement of the pendulum. When break-away occurs, the pendulum will drop slightly until plate 19 contacts the end of spindle 23 which thereupon supports the pendulum in its displaced position and prevents its return to the vertical. The wrench is now reset, torque is again gently applied and the spindle advanced if the pendulum is lifted any further. This process is repeated until a point is reached at which the wrench will break away when the pendulum is lifted only slightly from the support of the spindle. At this point, the true break-away torque is indicated on scale 18 by pointer 17.

There may be incorporated with spindle 23 and plate 19 an electrical circuit for accurately signaling the instant at which the pendulum is lifted free from the spindle. One such circuit is diagrammed in Fig. 6 in which the numeral 30 indicates an electric cell, one of whose terminals is connected by means of an operating switch 31, and a lead 32 to bushing 24. The other terminal of cell 30 is connected through a lead 33, a solenoid coil 34, and a lead 35 to housing 10.

Bushing 24 is insulated from housing 10 by an insulating bushing 36; electrical contact can be established from the bushing to the housing, however, through spindle 23 when the latter is in contact with plate 19, since current may then flow up through the metallic arms of the pendulum and through shaft 23 to housing 10. In parallel with the foregoing circuit, is a second circuit composed of a lead 37, a solenoid operated switch 39, a lead 40, an electric bulb 41 and a lead 42.

When the instrument is to be placed in use, switch 31 is closed and the wrench applied to coupling 12. As previously described, the spindle is rotated so as to follow up and support the pendulum near but slightly under the true static break-away point. As long as the pendulum is being supported by the spindle, the solenoid circuit is energized and hence switch 39 is held open and light 41 is not illuminated. When the wrench or other torque applier lifts the pendulum off the support, the solenoid circuit is opened and the solenoid switch 39 permitted to close, thereby causing bulb 41 to be illuminated. In order to measure the break-away point precisely, the light is observed and the apparatus so manipulated that the break-away occurs when only sufficient torque is applied to illumine bulb 34.

A further feature of our invention is a means for expanding the range of torque which may be measured. The largest torque which can be safely applied to coupling 12 is approximately that required to lift the pendulum to a nearly horizontal position. The measurement of much larger torques is made possible, however, by employment of compounding means including a second horizontal shaft 60 rotatably mounted in housing 10 parallel to shaft 11 and having coupling 61 to which torque may be applied. Fixed to shaft 60 and extending radially therefrom is a link 62 which is pivotally connected by a pin 63 to a second link 64 which is pivotally connected by a pin 65 to pendulum arms 15 and 16 just below shaft 11. As best illustrated in Fig. 4, weight 14 acts downwardly about its fulcrum at shaft 11 with about four times the lever arm of pin 65. The resultant effect is about the same, in the case of this particular embodiment, as if a mass four times as great as weight 14 were suspended from link 62 at pin 63. In other words weight 14 acts through a linkage of high mechanical advantage to oppose any movement by pin 63. As a result the weight, and correspondingly the pointer, are moved only slightly when a comparatively large torque is applied to shaft 60. If the same torque however is applied to shaft 11, it is opposed by weight 14 acting directly at the end of arms 15 and 16 without the benefit of the additional lever mechanism. As a result weight 14, and correspondingly pointer 17 must be displaced a somewhat greater distance before sufficient leverage is obtained to establish equilibrium.

Having now described our preferred form of invention, we wish it to be understood that we do not mean to be limited to the particular form or arrangement of parts herein described and shown, which is merely illustrative of the broad principles of our invention as defined by the appended claims.

We claim:

1. A torque measuring instrument having in combination: a frame; a substantially horizontal rotatable shaft mounted in said frame and having a coupling thereon adapted to be engaged by a torque tool; a weight fixed to and depending from said shaft; means for indicating angular displacement of said shaft; a second rotatable shaft mounted in said frame; coupling means on said second shaft adapted to have a torque tool applied thereto for applying torque to said second shaft; and an operative interconnection of mechanical advantage less than unity between the second-mentioned shaft and the first, whereby torque applied to either of said shafts may be measured by said indicating means.

2. A torque measuring instrument having in combination: a frame; a substantially horizontal rotatable shaft mounted in said frame; a weight fixed to and depending from said shaft; means for indicating angular displacement of said shaft;

a second rotatable shaft mounted in said frame; means for applying torque to said second shaft; a link fixed to said second shaft; a second link pivotally connected to said movable weight; and a pivotal connection between said links.

3. A torque measuring instrument having in combination: a frame; a substantially horizontal rotatable shaft mounted in said frame; a weight fixed to and depending from said shaft; means for applying torque to said shaft; means for indicating angular displacement of said shaft; and a threaded spindle mounted in said frame and adjustable to engage and support said weight in a variety of positions.

4. A torque measuring instrument having in combination: a frame; a substantially horizontal shaft mounted in said frame; a weight fixed to and depending from said shaft; means for applying torque to said shaft; means for indicating the angular displacement of said shaft; adjustable means for supporting said weight in a plurality of positions without interfering with further displacement as increased torque is applied to said shaft; and electrical means for indicating whether the applied torque or the adjustable support is displacing said weight.

5. A torque measuring instrument having in combination: a frame; a substantially horizontal rotatable shaft mounted in said frame; a weight fixed to and depending from said shaft; means for applying torque to said shaft; means for indicating angular displacement of said shaft; a threaded spindle mounted in said frame and adjustable to engage and support said weight in a variety of positions; a relay operated by contact between said weight and said spindle; and a signal controlled by said relay.

6. A torque measuring instrument for testing torque tools having in combination: a frame; a substantially horizontal rotatable shaft mounted in said frame and adapted to be fixedly engaged by a torque tool; a weight fixed to and depending from said shaft; means for indicating angular displacement of said shaft; a threaded spindle mounted in said frame and adjustable to engage and support said weight in a variety of positions; a relay energized by contact between said weight and said spindle; and a bulb illuminated when said relay is deenergized.

7. A torque measuring instrument having in combination: a frame; a substantially horizontal rotatable shaft mounted in said frame having coupling means thereon adapted to be engaged by a torque tool; a weight fixed to and depending from said shaft; means for indicating angular displacement of said shaft; a second horizontal rotatable shaft mounted in said frame; means for applying torque to said second shaft; an operative interconnection of mechanical advantage less than unity between the second-mentioned shaft and the first whereby torque applied to either of said shafts may be measured by said indicating means; and adjustable means for supporting said weight in a plurality of positions without interfering with further displacement as increased torque is applied.

8. A torque measuring instrument having in combination: a frame; a substantially horizontal rotatable shaft mounted in said frame having coupling means thereon adapted to be engaged by a torque tool; a weight fixed to and depending from said shaft; means for indicating angular displacement of said shaft; a second horizontal rotatable shaft mounted in said frame; means for applying torque to said second shaft; an operative interconnection of mechanical advantage less than unity between the second-mentioned shaft and the first whereby torque applied to either of said shafts may be measured by said indicating means; adjustable means for supporting said weight in a plurality of positions without interfering with further displacement as increased torque is applied; and means for indicating whether the applied torque or the adjustable support is displacing said weight.

9. A torque measuring instrument having in combination: a frame; a substantially horizontal rotatable shaft mounted in said frame; a weight fixed to and depending from said shaft; means for indicating angular displacement of said shaft; a second rotatable shaft mounted in said frame; means for applying torque to said second shaft; an operative interconnection of mechanical advantage less than unity between the second-mentioned shaft and the first; a threaded spindle mounted in said frame and adjustable to engage and support said weight in a variety of positions; a relay operated by contact between said weight and said spindle; and a signal controlled by said relay.

10. A torque measuring instrument for testing torque tools comprising: a generally rectangular frame; a horizontal shaft rotatably mounted in the upper portion of said frame, said shaft having a portion adapted to receive and be engaged by a torque tool to be tested; a pendulum fixed to said shaft and normally depending therefrom but adapted to be swung upwardly upon rotation of said shaft; a calibrated scale carried by said frame; a pointer fixed to said shaft and movable in a plane parallel to said scale adjacent thereto; a threaded spindle horizontally mounted in one side of said frame and insulated therefrom, and adjustable to follow up said pendulum to engage and support the same as it rotates from its normal position; a member on said pendulum positioned to be engaged by said spindle in all positions of said pendulum; and an electric circuit including said spindle, spindle engaging member and a signal adapted to operate whenever said pendulum is moved away from said spindle to disengage the latter from said member carried by said pendulum, to thereby indicate movement of said pendulum.

11. A torque measuring instrument having in combination: a frame; a movable weight so mounted on said frame that its resistance to displacement increases as displacement increases; means responsive to the application of torque for displacing said weight; means indicating the displacement of said weight; and a threaded spindle mounted in said frame and adjustable to engage and support said weight in a variety of positions.

JAMES D. BURKE.
FULLER A. CROOKS.

REFERENCES CITED

The following references are of record in the file of this patent:

UNITED STATES PATENTS

| Number | Name | Date |
|---|---|---|
| 1,981,960 | Lewis | Nov. 27, 1934 |
| 2,250,941 | Zimmerman | July 29, 1941 |
| 2,324,497 | Rentis | July 20, 1943 |
| 2,337,951 | Whitehead | Dec. 28, 1943 |
| 2,342,919 | Chapman | Feb. 29, 1944 |
| 2,443,049 | McVey | June 8, 1948 |